United States Patent
Taniguchi et al.

(10) Patent No.: US 7,174,978 B2
(45) Date of Patent: Feb. 13, 2007

(54) HYBRID DRIVE UNIT, AND FRONT-ENGINE/REAR-DRIVE TYPE AUTOMOBILE HAVING THE HYBRID DRIVE UNIT MOUNTED THEREON

(75) Inventors: Takao Taniguchi, Anjo (JP); Kazumasa Tsukamoto, Anjo (JP); Kozo Yamaguchi, Anjo (JP); Kazuhisa Ozaki, Anjo (JP); Takeshi Inuzuka, Anjo (JP); Satoru Wakuta, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/397,427

(22) Filed: Mar. 27, 2003

(65) Prior Publication Data
US 2004/0011576 A1    Jan. 22, 2004

(30) Foreign Application Priority Data
Mar. 29, 2002 (JP) ............................. 2002-098017
Mar. 29, 2002 (JP) ............................. 2002-098018

(51) Int. Cl.
*B60K 6/02* (2006.01)

(52) U.S. Cl. ...................... 180/65.1; 475/5; 903/951; 903/905; 903/906; 903/911

(58) Field of Classification Search ............. 180/65.1, 180/65.2, 65.3, 65.4, 65.5, 65.6, 65.7; 475/5 X, 475/230, 231; 903/951, 952, 915, 916, 920, 903/905, 906, 909, 910, 911, 926, 927
See application file for complete search history.

(56) References Cited

U.S. PATENT DOCUMENTS

| | | | | |
|---|---|---|---|---|
| 3,620,323 A | * | 11/1971 | Maeda et al. | 180/65.2 |
| 4,884,650 A | * | 12/1989 | Fujiki et al. | 180/197 |
| 4,938,306 A | * | 7/1990 | Sumiyoshi et al. | 180/233 |
| 5,353,889 A | * | 10/1994 | Hamada | 180/242 |
| 5,513,719 A | * | 5/1996 | Moroto et al. | 180/65.4 |
| 5,904,631 A | * | 5/1999 | Morisawa et al. | 475/5 |
| 5,988,307 A | * | 11/1999 | Yamada et al. | 180/243 |
| 6,002,979 A | * | 12/1999 | Ishizu | 701/86 |
| 6,041,877 A | * | 3/2000 | Yamada et al. | 180/65.2 |
| 6,067,801 A | * | 5/2000 | Harada et al. | 60/705 |
| 6,155,364 A | * | 12/2000 | Nagano et al. | 180/65.2 |
| 6,258,006 B1 | * | 7/2001 | Hanyu et al. | 477/5 |
| 6,321,865 B1 | * | 11/2001 | Kuribayashi et al. | 180/243 |
| 6,378,638 B1 | * | 4/2002 | Mizon et al. | 180/65.6 |
| 6,429,541 B2 | | 8/2002 | Takenaka et al. | |
| 6,510,911 B1 | * | 1/2003 | Satou et al. | 180/65.2 |

(Continued)

FOREIGN PATENT DOCUMENTS

DE          019639904 A1 *  5/1997 ................. 903/916

(Continued)

*Primary Examiner*—Christopher P. Ellis
*Assistant Examiner*—John Walters
(74) *Attorney, Agent, or Firm*—Oliff & Berridge, PLC

(57) ABSTRACT

A hybrid drive unit including a first motor, a first planetary gear and a second motor, wherein the first planetary gear distributes and transmits a drive force transmitted from an input shaft to the first motor and an output shaft, a power output from the output shaft and the second motor are synthesized and the first motor and the first planetary gear are housed in a transmission case with the second motor spaced from the transmission case.

2 Claims, 9 Drawing Sheets

U.S. PATENT DOCUMENTS

| | | | |
|---|---|---|---|
| 6,557,656 B2 * | 5/2003 | Haniu et al. | 180/65.6 |
| 6,589,128 B2 * | 7/2003 | Bowen | 475/5 |
| 6,702,708 B2 * | 3/2004 | Goto et al. | 475/231 |
| 6,724,100 B1 * | 4/2004 | Gabriel | 307/9.1 |
| 6,808,470 B2 * | 10/2004 | Boll | 477/6 |
| 2002/0153727 A1 | 10/2002 | Takenaka et al. | |
| 2003/0075368 A1 * | 4/2003 | Takaoka et al. | 180/65.2 |
| 2003/0106729 A1 * | 6/2003 | Noreikat et al. | 180/65.7 |
| 2004/0018910 A1 * | 1/2004 | Krzesicki et al. | 475/230 |
| 2005/0064974 A1 * | 3/2005 | Bezian et al. | 475/5 |

FOREIGN PATENT DOCUMENTS

| | | | |
|---|---|---|---|
| EP | 198 03 160 C1 | 1/1998 | |
| JP | 403239631 A * | 10/1991 | 180/65.7 |
| JP | 404243627 A * | 8/1992 | 180/65.2 |
| JP | A-5-50867 | 3/1993 | |
| JP | A-5-305823 | 11/1993 | |
| JP | 09175199 A * | 7/1997 | |
| WO | WO 92/20544 | 11/1992 | |

* cited by examiner

HYBRID DRIVE UNIT, AND FRONT-ENGINE/REAR-DRIVE TYPE AUTOMOBILE HAVING THE HYBRID DRIVE UNIT MOUNTED THEREON

BACKGROUND OF THE INVENTION

1. Field of Invention

The invention relates to a hybrid drive unit and an FR (as abbreviated from "Front-Engine/Rear-Drive") type automobile having the hybrid drive unit mounted thereon.

2. Description of Related Art

The hybrid drive unit is exemplified by a so-called "two-motor type", wherein two motors are used, which is mounted on an automobile. In this two-motor type, the output torque of a planetary gear is continuously controlled by distributing the output torque from an engine to a motor (generally called the "generator") and an output shaft. Also, the output torque of another motor (generally called the "drive motor") is synthesized, if necessary, with the planetary gear output torque and is outputted to the output shaft.

The two-motor type hybrid drive unit is mounted as an FF (as abbreviated from "Front-Engine/Front-Drive") type on the automobile. As disclosed in German Patent No. DE 19803160, for example, it is intended to mount the hybrid drive unit on a front engine, rear wheel drive type large-sized automobile. This front engine, rear wheel drive type hybrid drive unit is schematically shown in FIG. 9.

In an automobile 1 having the hybrid drive unit mounted thereon, as shown in FIG. 9, an internal combustion engine 6 such as a gasoline engine is so arranged in the front portion of a body 2, i.e., in the portion between front wheels 3a and 3b with the crank shaft positioned in the longitudinal direction. Moreover, the two-motor type hybrid drive unit 54 is arranged at the back of and adjacent to the engine 6. In the hybrid drive unit 54, a first motor (or generator) 10, a power distributing planetary gear 11 and a second motor (or drive motor) 40 are arranged with the crank shaft generally in the axial direction and are arranged sequentially in the recited order from the engine side. Here, reference numerals 4a and 4b designate the drive shafts of the left and right front wheels 3a and 3b, respectively.

In the hybrid drive unit 54, an input shaft 28 is connected through a damper unit 9 to an output shaft 6a formed on the backward protruding portion of the engine crank shaft, and the first motor 10 is coaxially arranged around the input shaft 28. The first motor 10 is of a synchronous AC permanent magnet type (or a brushless DC motor) and is composed of a stator 10a fixed in a case, and a rotor 10b rotatably supported through a predetermined air gap in the stator.

The power distributing planetary gear 11 is formed of a simple planetary gear arranged coaxially with the input shaft 28, and is composed of a carrier C1 connected to the input shaft 28 for supporting a plurality of planetary pinions P1; a sun gear S1 connected to the rotor 10b; and a ring gear R1 for acting as a power outputting portion. The ring gear R1 is connected to an output shaft 12 extending backward on the axis common with the input shaft 28.

The second motor 40 is formed of a brushless DC motor similar to but larger than the motor 10 and is arranged coaxially with and around the output shaft 12. The second motor 40 is composed of a stator 40a fixed in a case, and a rotor 40b rotatably supported through a predetermined air gap in the stator. Here, the hybrid drive unit 54 is housed in the integral case and is mounted by fixing the front end of the integral case on the rear end face of the engine 6. The output shaft 12 further extends backward from the case and is connected to a differential unit 15 through a flexible coupling 43 and a known propeller shaft 13 (including, as a matter of fact, the universal joint and the center bearing, although not shown) and further from the differential unit through left and right drive shafts 8a and 8b to rear wheels 5a and 5b.

In the front engine rear wheel drive type automobile 1 having the present hybrid drive unit 54 mounted thereon, the output of the engine 6 is transmitted through the damper unit 9 and the input shaft 28 to the carrier C1 of the power distributing planetary gear 11. At the planetary gear 11, the engine output is distributed and transmitted from the sun gear S1 to the first motor (or generator) 10 and from the ring gear R1 to the output shaft 12. By controlling the first motor 10, the output torque and the rotation are continuously adjusted and outputted to the output shaft 12. When a high torque is required for the starting time or the like, moreover, the second motor (or drive motor) 40 is driven so that the motor torque is transmitted, while assisting the torque of the output shaft 12, to the propeller shaft 13 and further through the differential unit 15 and the left and right drive shafts 8a and 8b to the rear wheels 5a and 5b.

Here, the second motor 40 employs not only the generated power of the first motor 10 but also, when that power is short, the energy from the battery stored by the first motor 10. The second motor also functions as a regenerator at a braking time.

In the differential unit 15 to which the drive force is transmitted from the engine 6 and/or the second motor 40, on the other hand, hypoid gears may be adopted as a ring gear 26 (as referred to FIG. 2) and a drive pinion 25 (as referred to FIG. 2) meshing with the ring gear 26. This arrangement can be used in order to lower the propeller shaft 13 and accordingly the floor of the compartment, by offsetting the center line of rotation of the ring gear 26 and the center of rotation of the drive pinion 25.

SUMMARY OF THE INVENTION

The two-motor type hybrid drive unit 54 thus far described is enabled by its high energy efficiency to have excellent effects for improving the fuel economy, for reducing the exhaust gases and so on. However, the size of the first motor 10 is regulated by the output torque of the engine, and the size of the second motor 40 is also regulated by the vehicle weight and the acceleration demanding performance.

When the hybrid drive unit is applied to a vehicle having a large engine displacement, therefore, the vehicle is usually the front engine rear wheel drive type. If the first motor 10 and the second motor 40 are adopted to satisfy the demands, however, the hybrid drive unit 54, as housed in the integral case and mounted on the engine 6, makes it difficult to satisfy the external diameter and axial size (accumulated thickness) requirements in order to contain for the first motor 10 and the second motor 40 in the space for arranging the prevailing automatic transmission, as indicated by a dotted line A in FIG. 9. In order to mount the hybrid drive unit 54 on the front engine rear wheel drive type automobile, especially an automobile having an engine of a large displacement mounted thereon, it is necessary to change the vehicle itself drastically by renewing a platform or the like and to sacrifice the space for the passengers (or cargoes).

Also, the hypoid gear has a high contact ratio so that it can acquire excellent transmission efficiency. But the hypoid gear transmits the rotation while being in sliding contact in the widthwise direction of the teeth. When electric energy is recovered (or regenerated) by the second motor 40 at a braking time of the vehicle, therefore, the transmission efficiency of the turning force to be transmitted from the drive shafts 8a and 8b of the rear wheels 5a and 5b through the ring gear 26, the drive pinion 25 and so on is lowered. The transmission efficiency is lowered, especially at the meshing portion between the ring gear 26 and the drive pinion 25, thereby to considerably reduce the regeneration efficiency from the turning force to be transmitted from the drive pinion 25 through the propeller shaft 13 to the second motor 40. Especially in the FR structure thus far described, the load on the rear wheels is lowered by the movement of the center of gravity (or load) of the vehicle at the braking time. Also, the transmission efficiency by the hypoid gear for the rotating power transmission, while sliding their tooth faces, is deteriorated to about 60%, so that the regeneration efficiency is deteriorated to lower the mileage.

The invention thus provides a hybrid drive unit, which is enabled by arranging a second motor from an engine, a first motor and so on to eliminate disadvantages, such as, a drastic change in a renewal of a platform and a sacrifice of space for passengers (or cargoes), and a front engine rear wheel drive type automobile having the hybrid drive unit mounted thereon.

The invention also provides a hybrid drive unit, which is enabled to solve the aforementioned problems by achieving high regeneration efficiency by the second motor at the braking time or the like, and an front engine rear wheel drive type automobile having the hybrid drive unit mounted thereon.

According to a first exemplary aspect of the invention, the hybrid drive unit, includes a first motor and a first planetary gear housed in a transmission case with a second motor spaced from the transmission case. Therefore, it is possible to improve the degree of freedom for designing and mounting the hybrid drive unit on the front engine rear wheel drive type automobile. Moreover, the first motor and the second motor can be supported by different vibration systems so that the motor supporting precision can be improved to improve the efficiency.

For the purposes of this disclosure, device and means may be considered synonyms. Further, in some cases, as defined in the specification, the device/means may include other elements.

BRIEF DESCRIPTION OF THE DRAWINGS

Various embodiments of the invention will be described with reference to the following figures, in which.

DETAILED DESCRIPTION OF PREFERRED EMBODIMENTS

Figure 1:
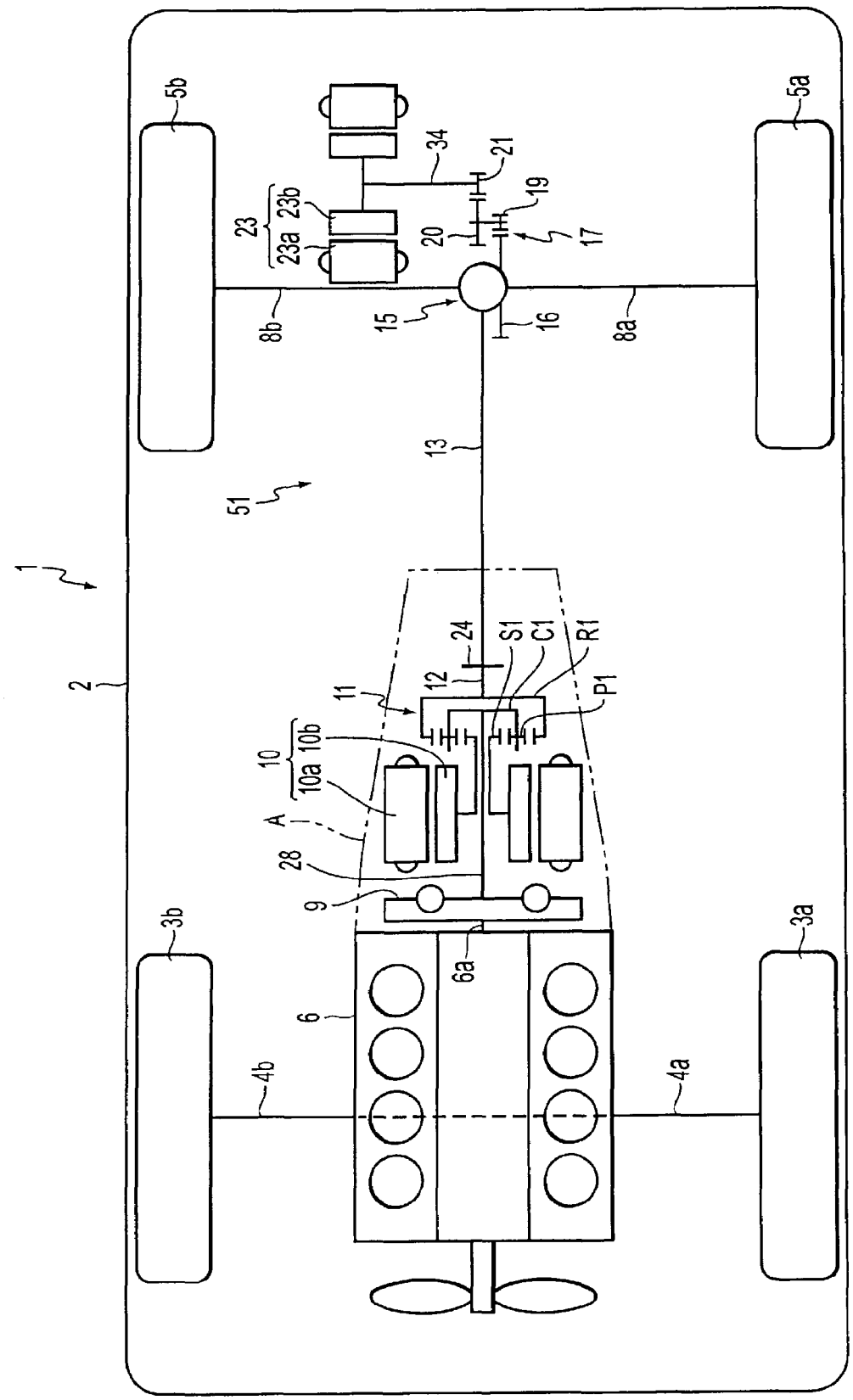
FIG. 1 is a schematic top plan view showing one example of an automobile, on which a hybrid drive unit of a first embodiment according to the invention is mounted.
Figure 2:
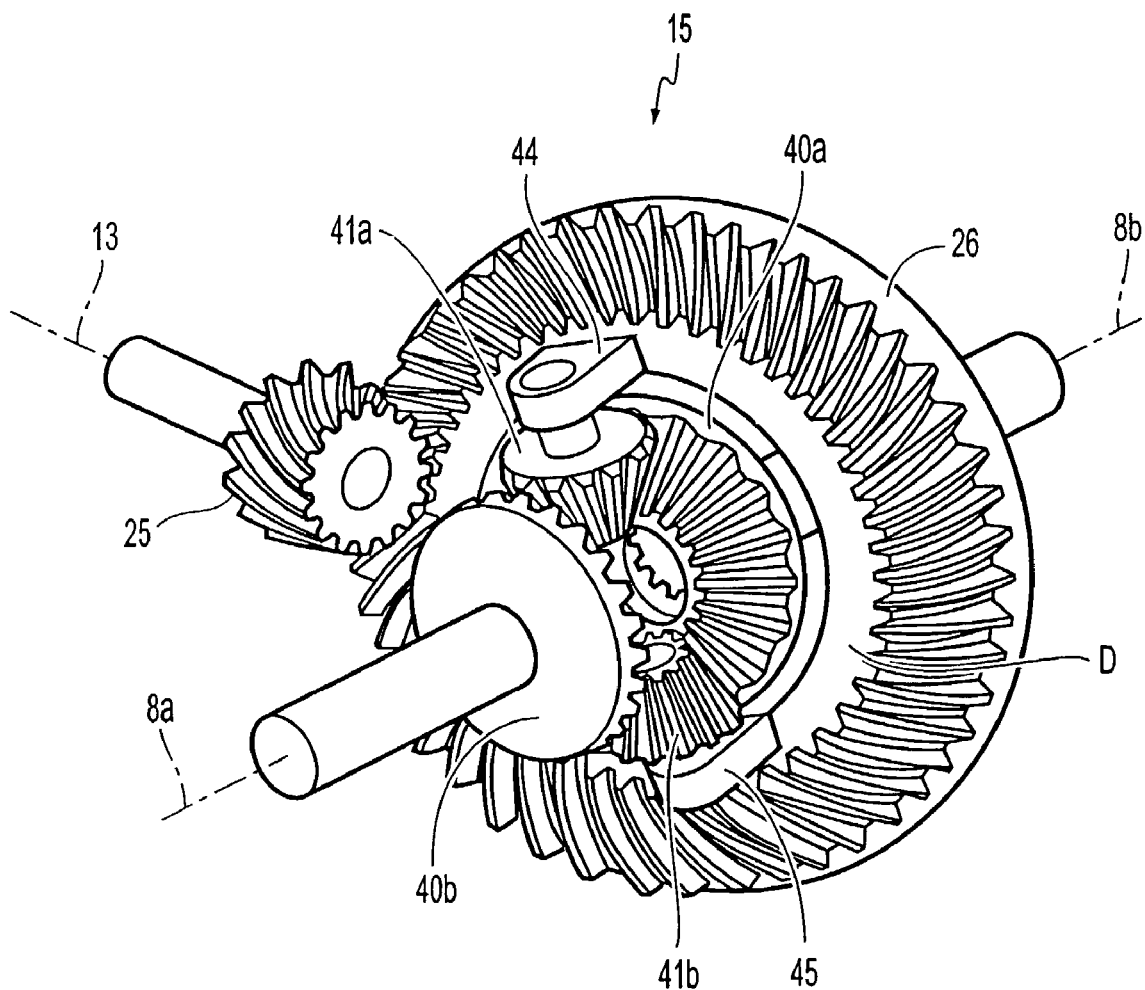
FIG. 2 is a perspective view showing a fundamental structure of a differential unit of FIG. 1.

The first embodiment of the invention will be described with reference to the accompanying drawings. FIG. 1 is a schematic top plan view showing one example of an automobile, on which a hybrid drive unit of this embodiment is mounted, and FIG. 2 is a perspective view showing a fundamental structure of a differential unit belonging to the automobile. In an automobile 1 having the hybrid drive unit 51 mounted thereon, as shown in FIG. 1, an internal combustion engine 6, such as a gasoline engine, is in front of a body 2 and generally between front wheels 3a and 3b as to have its crank shaft in the longitudinal direction. On the back of the engine 6, moreover, a first motor (or generator) 10 and a power distributing planetary gear 11, which form a part of the hybrid drive unit 51, are arranged generally in the axial direction of the crank shaft in the space arranged in the conventional automatic transmission, as indicated by a dotted line A, and are arranged sequentially from the engine side. Here, reference numerals 4a and 4b designate the drive shafts of the front wheels 3a and 3b, respectively.

In the hybrid drive unit 51, an input shaft 28 is connected through a damper unit 9 to an output shaft 6a formed of the backward protruding portion of the engine crank shaft, and the first motor 10 is arranged coaxially around the input shaft 28. The first motor 10 is of a synchronous AC permanent magnet type (or a brushless DC motor) and is composed of a stator 10a fixed in a case, and a rotor 10b rotatably supported through a predetermined air gap in the stator.

On the other hand, the power distributing planetary gear 11 is formed of a simple planetary gear arranged coaxially with the input shaft 28. The power distribution planetary gear 11 is composed of a carrier C1 connected to the input shaft 28 for supporting a plurality of planetary pinions P1, a sun gear S1 connected to the rotor 10b, and a ring gear R1 for acting as a power outputting portion. The ring gear R1 is connected to an output shaft 12 extending backward on the axis common with the input shaft 28.

The output shaft 12, fixing the ring gear R1 integrally, is connected to a differential unit 15 through a flexible coupling 24 and a known propeller shaft 13 (including, as a matter of fact, the universal joint and the center bearing, although not shown) and further from the differential unit through left and right drive shafts 8a and 8b to rear wheels 5a and 5b.

On the transmission downstream side of the later-described ring gear 26 (as referred to FIG. 2) of the differential unit 15, moreover, a second motor 23 is so arranged and is associated with the ring gear 26. The second motor 23 of the present hybrid drive unit 51, and the first motor 10 are connected together by the power distributing planetary gear 11 and so on. The second motor 23 is made of a brushless DC motor similar to but larger than the motor 10 and is composed of a stator 23a fixed in a stationary member such as a case and a rotor 23b rotatably supported through a predetermined air gap in the stator 23a.

As shown in FIG. 2, on the other hand, the differential unit 15 includes: the ring gear 26 fixed in a differential case D (although partially omitted for conveniences); a drive pinion 25 meshing with the ring gear 26 and fixed on the leading end of the propeller shaft 13, side gears 40a and 40b positioned in the differential case D and connected to the drive shafts 8a and 8b, respectively, and pinion gears 41a and 41b meshing with the side gears 40a and 40b, respectively, and supported in the differential case D through brackets 44 and 45. The differential unit 15 is so constructed as to rotate the left and right rear wheels 5a and 5b differentially on the basis of the rotation of the ring gear 26. Moreover, the drive pinion 25 and the ring gear 26 are made of hypoid gears and are so arranged that the center line of rotation of the ring gear 26 and the center of rotation of the drive pinion 25 meshing with the former may be offset to lower the propeller shaft 13 and accordingly the floor of the car compartment.

As shown in FIG. 1 and FIG. 2, moreover, a rotation transmitting gear 16 is arranged so coaxially and in parallel with the ring gear 26 that it may be able to rotate integrally with the gear 26. And, the rotation transmitting gear 16 is connected to the rotor 23b of the second motor 23 through a reduction gear train 17 having a plurality of gears 19, 20 and 21 in parallel. This reduction gear train 17 is composed of: the gear 19 having a smaller diameter and supported rotatably by the not-shown support device, the gear 20 having a larger diameter and made coaxial and integral with the gear 19, and the gear 21 integrated with the leading end of the output shaft 34 of the rotor 23b. By the reduction gear train 17, the output shaft 34 and accordingly the second motor 23 are arranged along the axial direction of the drive shafts 8a and 8b.

Here in FIG. 2, the ring gear 26 is so drawn to this side that its tooth faces may be clarified. In case the rotation transmitting gear 16 of FIG. 1 is to be applied to the ring gear 26 of FIG. 2, however, it is so arranged so that it may be able to rotate coaxially and integrally with the ring gear 26 on the back side of the ring gear 26 (or on the other side of FIG. 2).

In the front engine rear wheel drive type automobile 1 having the present hybrid drive unit 51 mounted thereon, the output of the engine 6 is transmitted through the damper unit 9 and the input shaft 28 to the carrier C1 of the power distributing planetary gear 11. At this planetary gear 11, the engine output is distributed and transmitted from the sun gear S1 to the first motor (or generator) 10 and from the ring gear R1 to the output shaft 12. By controlling the first motor 10, the output torque and the rotation are continuously adjusted and outputted to the output shaft 12.

In case a high torque is required for the starting time or the like, moreover, the second motor (or drive motor) 23 is driven so that the rotation (or the motor torque) of its rotor 23b is transmitted through the output shaft 34, the gear 21, the larger gear 20, the smaller gear 19 and the rotation transmitting gear 16 to the ring gear 26 of the differential unit 15. The motor torque is further transmitted, while assisting the torque to be transmitted from the propeller shaft 13 to the ring gear 26, through the pinion gears 41a and 41b, the side gears 40a and 40b and the left and right drive shafts 8a and 8b to the rear wheels 5a and 5b.

Here, the second motor 23 employs not only the generated power of the first motor 10 but also, when that power is short, the energy from the battery stored by the first motor 10. The second motor 23 also functions as a regenerator at a braking time. When the braking operation is done by the driver, for example, the second motor 23 functions as the regenerative brake or the regenerator to recover (or regenerate) the energy from the side of the rear wheels 5a and 5b. At this time, the second motor 23 is connected to the transmission downstream side of the ring gear 26 of the differential unit 15 so that the torque is transmitted, not through the meshing portion of that unit 15 between the drive pinion 25 and the ring gear 26, but from the drive shafts 8a and 8b through the side gears 40a and 40b, the pinion gears 41a and 41b, the ring gear 26 (or the differential case D), the rotation transmitting gear 16 and the reduction gear train 17. Therefore, the transmission efficiency, as might otherwise be usually reduced by about 40%, can be improved to effect the regeneration at a high efficiency. Moreover, what is inputted to the hypoid gears 25 and 26 is the product of the engine torque and the power share, thereby to provide an effect that the sizes of the hypoid gears can be reduced.

In the embodiment, moreover, the second motor 23 is arranged on the transmission downstream side of the ring gear 26 of the differential unit 15. That is, associatively at and downstream of the differential casing D so that it is positioned separately from the internal combustion engine 6, the first motor 10 and so on. Therefore, the second motor 23 can be arranged independently of the body shape along the propeller shaft 13. As a result, it is possible to improve the degree of freedom for mounting the hybrid drive unit 51 on the front engine rear wheel drive type automobile 1 and to support the first motor 10 and the second motor 23 by the different vibration systems, thereby to improve the supporting precisions of the motors and accordingly the efficiencies of the same. Thus, the first motor 10, the power distributing planetary gear 11 and so on can be housed in the arranging space A of the conventional automatic transmission. Therefore, the drive unit 51 realized can be suitably mounted on the front engine rear wheel drive type automobile which can mount an engine of a large displacement, while making unnecessary a drastic change in the vehicle itself by renewing the platform or the like and a disadvantage of sacrificing the space for the passengers (or cargoes). Moreover, the second motor 23 need not be especially small-sized, for example, so that a motor expected to generate a sufficient torque can be adopted as the second motor 23.

The automobile 1 having the hybrid drive unit 51 mounted thereon is better improved in mileage than the case in which a vehicle without the second motor 23 is driven to run exclusively by the drive force of the engine 6. Therefore, the automobile 1 can reduce the size of the gasoline tank, which is usually arranged below the rear seat or the like, to a small size, so that the second motor 23 can be sufficiently arranged in the accordingly emptied space. In recent years, there have been vehicles which do not have the space in order to house a spare tire. In this structure, the second motor 23 can also be sufficiently arranged in the empty space, which is formed due to the absence of the spare tire housing portion.

In this embodiment, moreover, the rotation transmitting gear 16 is arranged coaxially and in parallel with the ring gear 26, so as to rotate integrally, so that the rotation of the ring gear 26 may be transmitted through the rotation transmitting gear 16 to the second motor 23. With this construction, therefore, only one second motor 23 can be arranged to further simplify the construction of the hybrid drive unit 51. Moreover, the rotation transmitting gear 16 is connected to the second motor 23 by fixing itself in the differential case D so that it may rotate integrally with the ring gear 26. Thus, the hybrid drive unit 51, which has the simple construction, is sufficiently operated by the single second motor 23 to perform the assistance and the regeneration at the braking time. Moreover, the rotation transmitting gear 16 is connected to the rotor 23b of the second motor 23 through the reduction gear train 17 composed of a plurality of parallel gears. By changing the number of gears of the reduction gear train 17 suitably, the second motor 23 can be connected easily and reliably to the rotation transmitting gear 16 in accordance with the arrangement of the motor 23.

Figure 3:
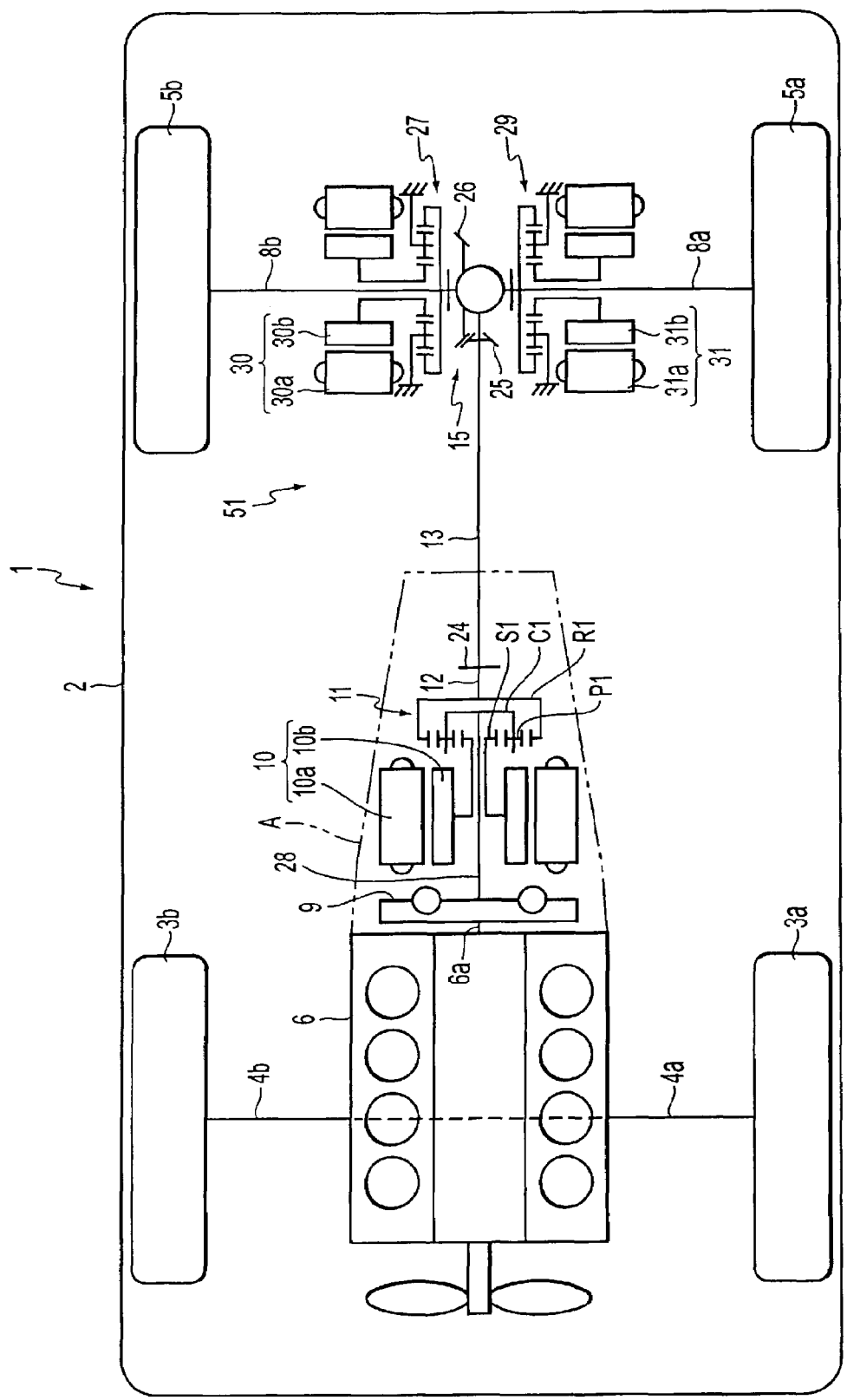
FIG. 3 is a schematic top plan view showing one example of an automobile, on which a hybrid drive unit of a second embodiment according to the invention is mounted.
Figure 4:
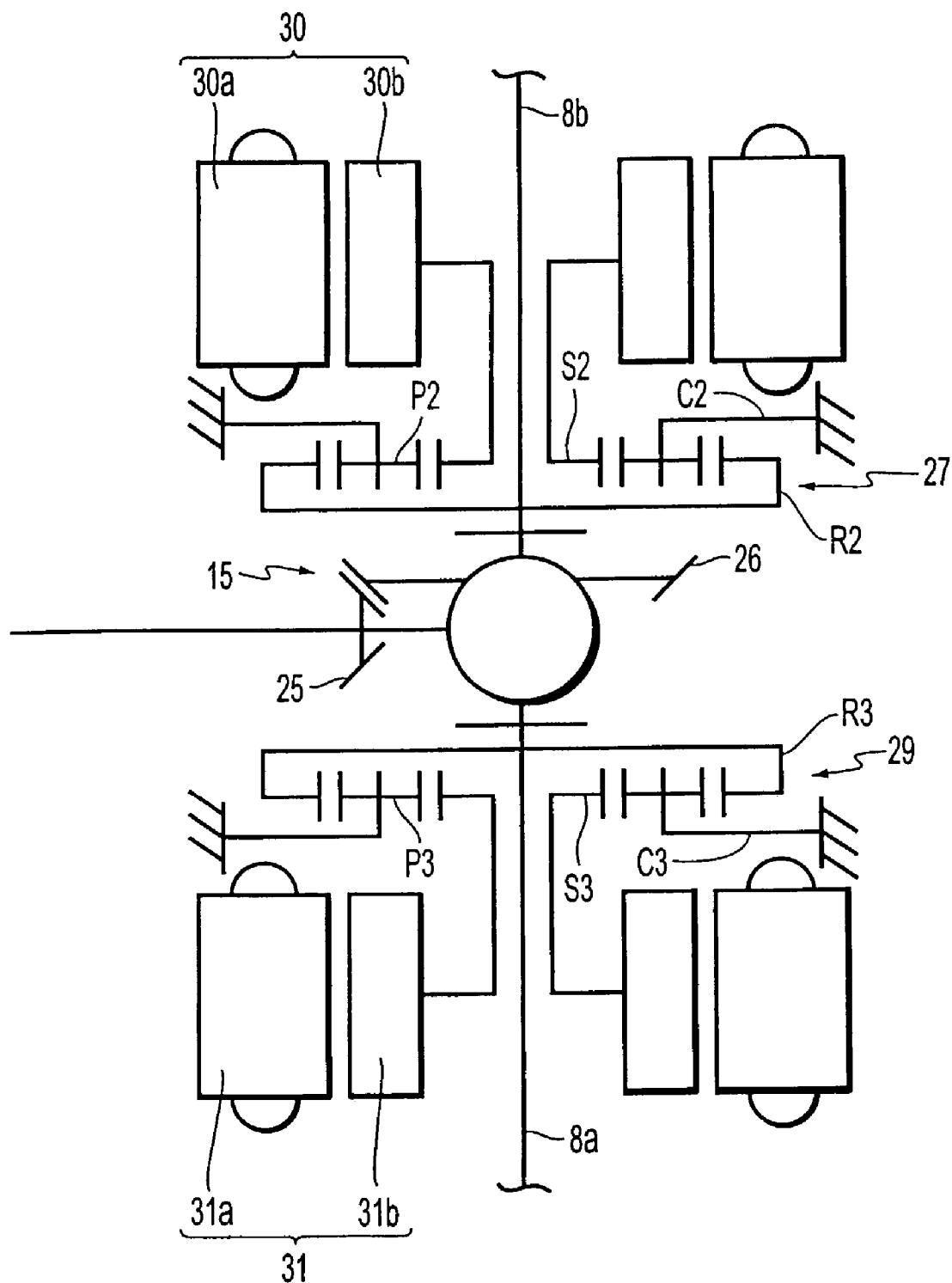
FIG. 4 is a schematic top plan view showing a second motor and so on of FIG. 3 in an enlarged scale.

The second embodiment will be described with reference to FIG. 3 and FIG. 4. FIG. 3 is a schematic top plan view showing one example of an automobile, on which a hybrid drive unit of this embodiment is mounted, and FIG. 4 is a schematic top plan view showing a second motor, as belonging to the drive unit, in an enlarged scale. This embodiment is similar to the first embodiment except the arrangement of the second motor, so that the construction and components common with those of the first embodiment will be omitted by designating them by the common reference numerals.

As shown in FIG. 3 and FIG. 4, this embodiment is constructed such that motors 31 and 30 act as the second motor for making the hybrid drive unit 51, together with the first motor 10 and so on, coaxially arranged on the left and right drive shafts 8a and 8b, respectively. Thereby, the rotation of the ring gear 26 is transmitted to the motors 31 and 30, respectively, through the left and right drive shafts 8a and 8b. In other words, the motor 31 is connected to the drive shaft 8a through a reducing planetary gear 29, and the motor 30 is connected to the drive shaft 8b through a reducing planetary gear 27, as shown in FIG. 3 and FIG. 4.

Each of the reducing planetary gears 29 and 27 is made of a simple planetary gear. The planetary gear 29 is composed of a ring gear R3 connected to the drive shaft 8a, a sun gear S3 connected to a rotor 31b, and a carrier C3 fixed to a stationary member such as a case for supporting a plurality of pinions P3. The planetary gear 27 is composed of a ring gear R2 connected to the drive shaft 8b, a sun gear S2 connected to a rotor 30b, and a carrier C2 fixed to a stationary member such as a case for supporting a plurality of pinions P2.

In the embodiment thus constructed, the hybrid drive unit 51 achieves, not only actions and effective substantially similar to those of the first embodiment, but also effects to be enumerated by the following. In the aforementioned first embodiment, specifically, the second motor 23 is connected to the ring gear 26 in the differential unit 15. As understood from FIG. 2, therefore, the rotating drive force, as returned at the braking time from the drive shafts 8a and 8b, is transmitted through the side gears 40a and 40b and the pinion gears 41a and 41b to the ring gear 26 and is extracted from the ring gear 26 (or the differential case D) and accordingly from the rotation transmitting gear 16. Therefore, the effect to suppress the transmission loss due to the meshing loss between the drive pinion 25 and the ring gear 26 can be sufficiently obtained. But the transmission loss due to the presence of the side gears 40a and 40b and the pinion gears 41a and 41b exists between the drive shafts 8a and 8b and the ring gear 26 (i.e., the rotation transmitting gear 16). According to the construction of this embodiment, however, the motors 31 and 30 as the second motor are directly connected to the drive shafts 8a and 8b, respectively. Therefore, the transmission loss due to those gears 40a and 40b, and 41a and 41b do not exist so that the energy recovering function by the regeneration at the braking time can be efficiently obtained.

In this embodiment, moreover, the motors 31 and 30, as the second motor, are arranged outside of the differential unit 15 and directly on the drive shafts 8a and 8b, respectively.

Therefore, the rotational drive forces from the second motors 31 and 30 are not inputted to the differential unit 15 so that the size of the differential unit 15 can be reduced. Moreover, the individual motors 31 and 30 are arranged to correspond to the left and right rear wheels 5a and 5b, respectively. Therefore, the individual rear wheels 5a and 5b can be driven while being smoothly and finely controlled, so that a highly precise running control can be made. Moreover, the second motors 31 and 30 are arranged on the left and right drive shafts 8a and 8b, respectively. Therefore, effects similar to those of the case of the single second motor can be achieved simply by arranging two motors capable of generating half torques, for example. Moreover, the left and right second motors 31 and 30 are arranged coaxially with the left and right drive shafts 8a and 8b, respectively. The rotors 31b and 30b of the second motors are connected to the left and right drive shafts 8a and 8b, respectively, through the reducing planetary gears 29 and 27 which are arranged coaxially with the left and right drive shafts 8a and 8b, respectively. Although the two second motors are employed, however, their arranging spaces can be reduced as much as possible. Another effect is that not only the sizes of the hypoid gears (25 and 26) but also the differential size can be reduced.

Figure 5:
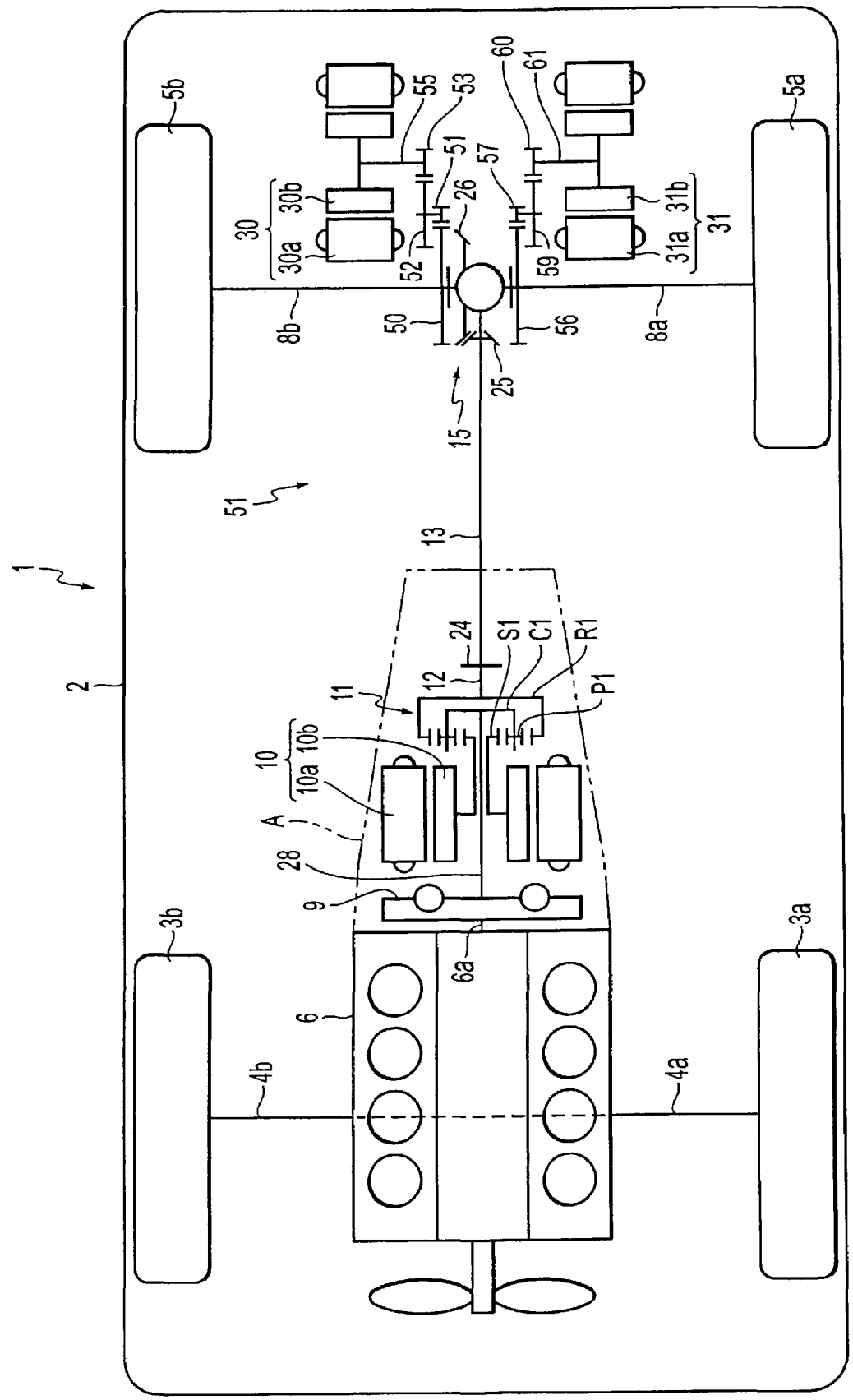
FIG. 5 is a schematic top plan view showing one example of an automobile, on which a hybrid drive unit of a third embodiment according to the invention is mounted.

The third embodiment will be described with reference to FIG. 5. FIG. 5 is a schematic top plan view showing one example of an automobile, on which a hybrid drive unit of this embodiment is mounted. This embodiment is similar to the first embodiment except the arrangement of the second motor, so that the construction and components common with those of the first embodiment will be omitted by designating them by the common reference numerals.

In this embodiment, as shown in FIG. 5, the second motors are arranged to be associated on the transmission downstream side of the ring gear 26 of the differential unit 15. The motors 31 and 30, as the second motors, connect the hybrid drive unit 51 together with the first motor 10 and so on and are made of brushless DC motors similar to but larger than the first motor 10. These motors 31 and 30 are provided with stators 31a and 30a fixed in the stationary member such as the case and rotors 31b and 30b rotatably supported through a predetermined air gap in the stators 31a and 30a.

On the drive shafts 8a and 8b protruding to the left and right from the differential unit 15, respectively, there are integrally fixed first and second rotation transmitting gears 56 and 50. Moreover, the motor 31 is constructed such that the drive shaft 8a and the rotor 31b can integrally rotate through a gear train meshing with the rotation transmitting gear 56. The motor 30 is constructed such that the drive shaft 8b and the rotor 30b can integrally rotate through a gear train meshing with the rotation transmitting gear 50. The gear train on the side of the motor 31 is composed of a gear 57 having a smaller diameter and supported rotatably by the not-shown support device, a gear 59 having a larger diameter and made coaxial and integral with the gear 57 and a gear 60 integrated with the leading end of the output shaft 61 of the rotor 31b. Moreover, the gear train on the side of the motor 30 is composed of a gear 51 having a smaller diameter and supported rotatably by the not-shown support device, a gear 52 having a larger diameter and made coaxial and integral with the gear 51 and a gear 53 integrated with the leading end of the output shaft 55 of the rotor 30b.

According to this embodiment thus constructed, actions and effects substantially similar to those of the first and second embodiments can be achieved, and the motors 31 and 30, as the second motor, are directly connected as in the second embodiment to the drive shafts 8a and 8b, respectively. Therefore, the transmission loss, as caused in the first embodiment due to the pinion gears 41a and 41b and so on, can also be eliminated so that the energy recovering efficiency by the regeneration at the braking time can be further enhanced. Moreover, the first and second rotation transmitting gears 56 and 50 are fixed on the left and right drive shafts 8a and 8b, respectively, and are connected to the rotors 31b and 30b of the left and right second motors 31 and 30, respectively, through the reduction gear train composed of a plurality of gears. By changing the number of gears of the reduction gear train suitably, there is realized the construction, which can connect the second motors 31 and 30 easily and reliably to the rotation transmitting gears 56 and 50 in accordance with the arrangements of the second motors 31 and 30, respectively.

Figure 6:
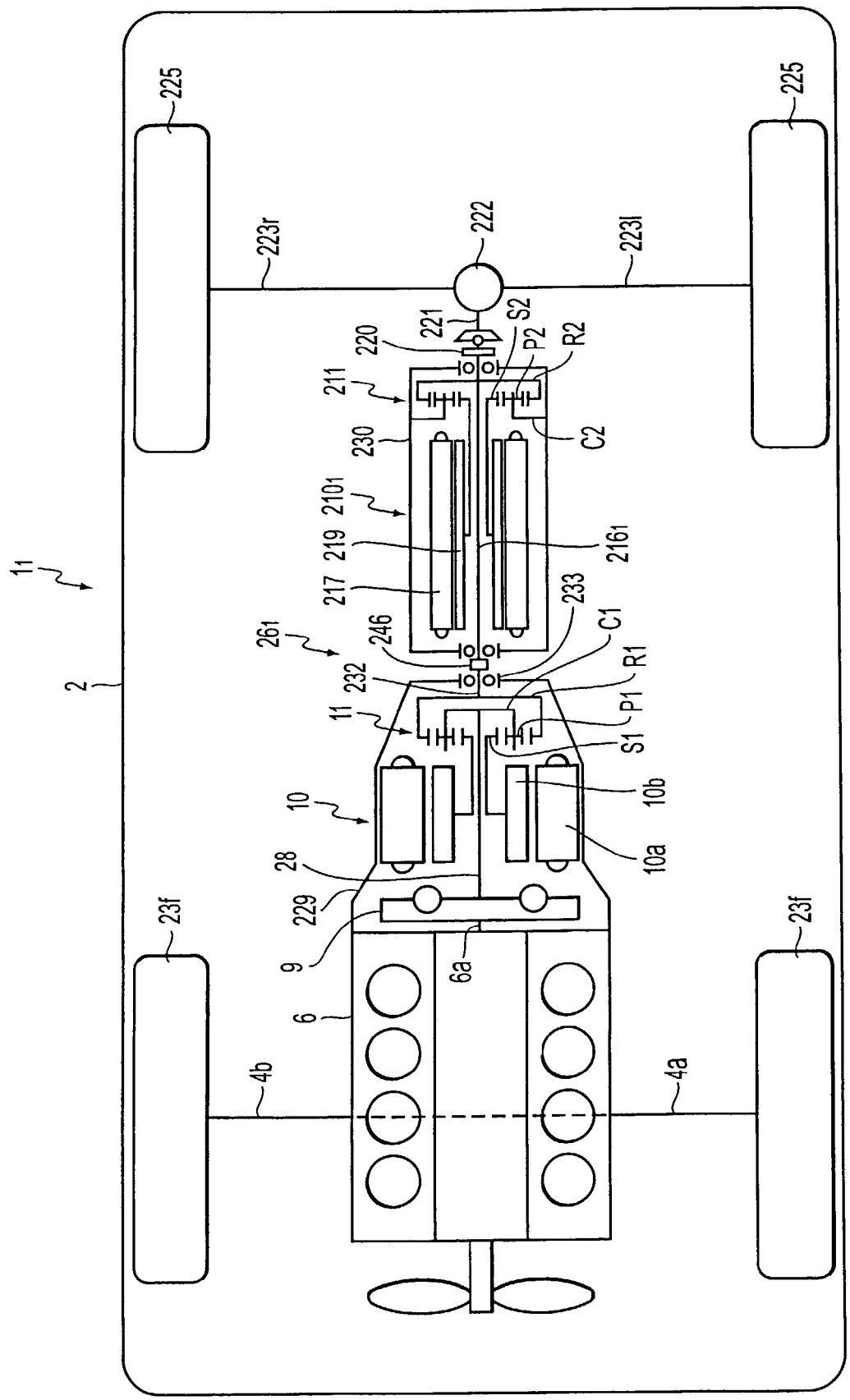
FIG. 6 is a schematic top plan view showing one example of an FR (Front-Engine/Rear-Drive) type automobile, on which a hybrid drive unit of a fourth embodiment according to the invention is mounted.

Here will be described the fourth embodiment of the invention. FIG. 6 is a top plan view schematically showing one example of a front engine rear wheel drive type automobile, on which a hybrid drive unit according to this embodiment is mounted. Numeral $1_1$ designates the front engine rear wheel drive type automobile having a hybrid drive unit $26_1$ mounted thereon. The body 2 of the automobile $1_1$ is suspended by left and right front wheels 23f and 23f and left and right rear wheels 225 and 225, and the internal combustion engine 6 is mounted on the front portion of the body 2 through the rubber mount with its crank shaft being arranged in the longitudinal direction.

The hybrid drive unit $26_1$ is constructed, like before, to include a first motor (or generator) 10, a power distributing planetary gear 11, a second motor (or drive motor) $210_1$ and a reducing planetary gear 211, all of which are aligned with the crank shaft and arranged sequentially in the recited order from the side of the engine 6. However, the first motor 10 and the power distributing planetary gear 11, and the second motor $210_1$ and the reducing planetary gear 211 are constructed separately from each other and are housed in a different transmission case 229 and motor housing 230, respectively.

The input shaft 28 of the hybrid drive unit $26_1$ is connected through a damper unit 9 to an output shaft 6a formed of the backward protruding portion of the crank shaft of the internal combustion engine 6, and the first motor 10 is arranged coaxially around the input shaft 28 aligned with the crank shaft. The first motor 10 is made of a brushless DC motor and is composed of a stator 10a fixed in the transmission case 229, and a rotor 10b rotatably supported through a predetermined air gap in the stator. The power distributing planetary gear 11 is formed of a simple planetary gear arranged coaxially with the input shaft 28, and is composed of a carrier C1 connected to the input shaft 28 for supporting a plurality of planetary pinions P1, a sun gear S1 connected to the rotor 10b, and a ring gear R1 for acting as a power outputting portion. The ring gear R1 is connected to an intermediate shaft 232 extending backward on the axis common with the input shaft 28.

Moreover, the damper device 9, the first motor 10 and the power distributing planetary gear 11 are housed in the transmission casing 229, which is mounted integrally with the internal combustion engine 6 such that its front-end face is fixed on the rear end face of the engine 6. Moreover, the intermediate shaft 232 is supported rotatably through a bearing 233 in the rear end portion of the transmission case 229. Therefore, the input shaft 28 is supported by the engine 6. That is, front-end side of the input shaft 28 is connected to the output shaft 6a of the engine 6, and is supported at its rear end by the transmission case 229 integrated with the engine 6. Here, the body 2 to be used is desirably identical to that for mounting the conventional automatic transmission (AT) and is provided with such a space so as to protrude into the compartment (between the driver's seat and the passenger's seat) for housing the automatic transmission. This space is set to have a size in order to house the transmission case 229.

The second motor $210_1$ is also made of a brushless DC motor similar to the first motor 10 but has higher output characteristics than those of the first motor 10. And, the second motor $210_1$ is constructed to include a stator 217, arranged coaxially with and around an output shaft $216_1$ connected to the intermediate shaft 232 and fixed in the case, and a rotor 219 rotatably supported through a predetermined air gap in the stator 217. And, the second motor $210_1$ is given such an axially enlarged structure and has a larger axial size in comparison with the diametrical size. Here, the diametrical size is the external diameter of the stator 217, and the axial size is the axial length of the stator core except the coil.

Figure 8:
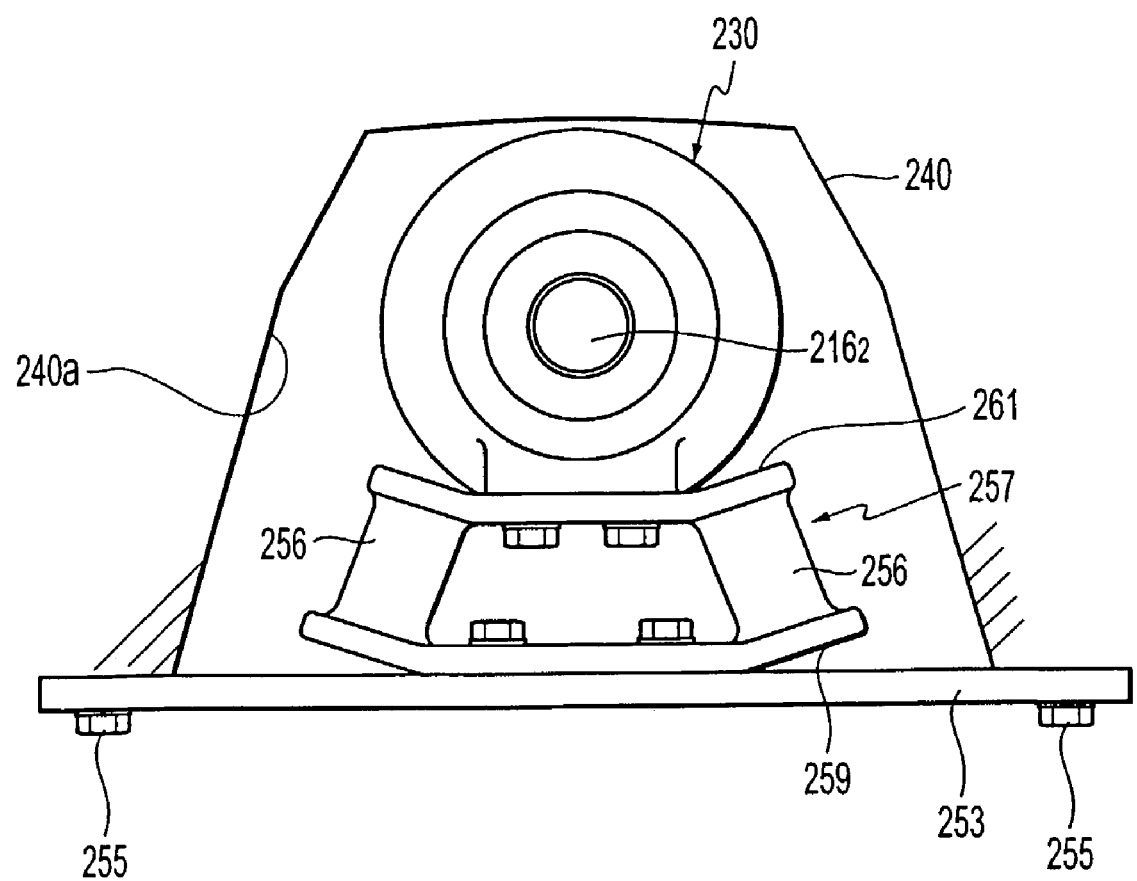
FIG. 8 is a view of the center housing.
Figure 9:
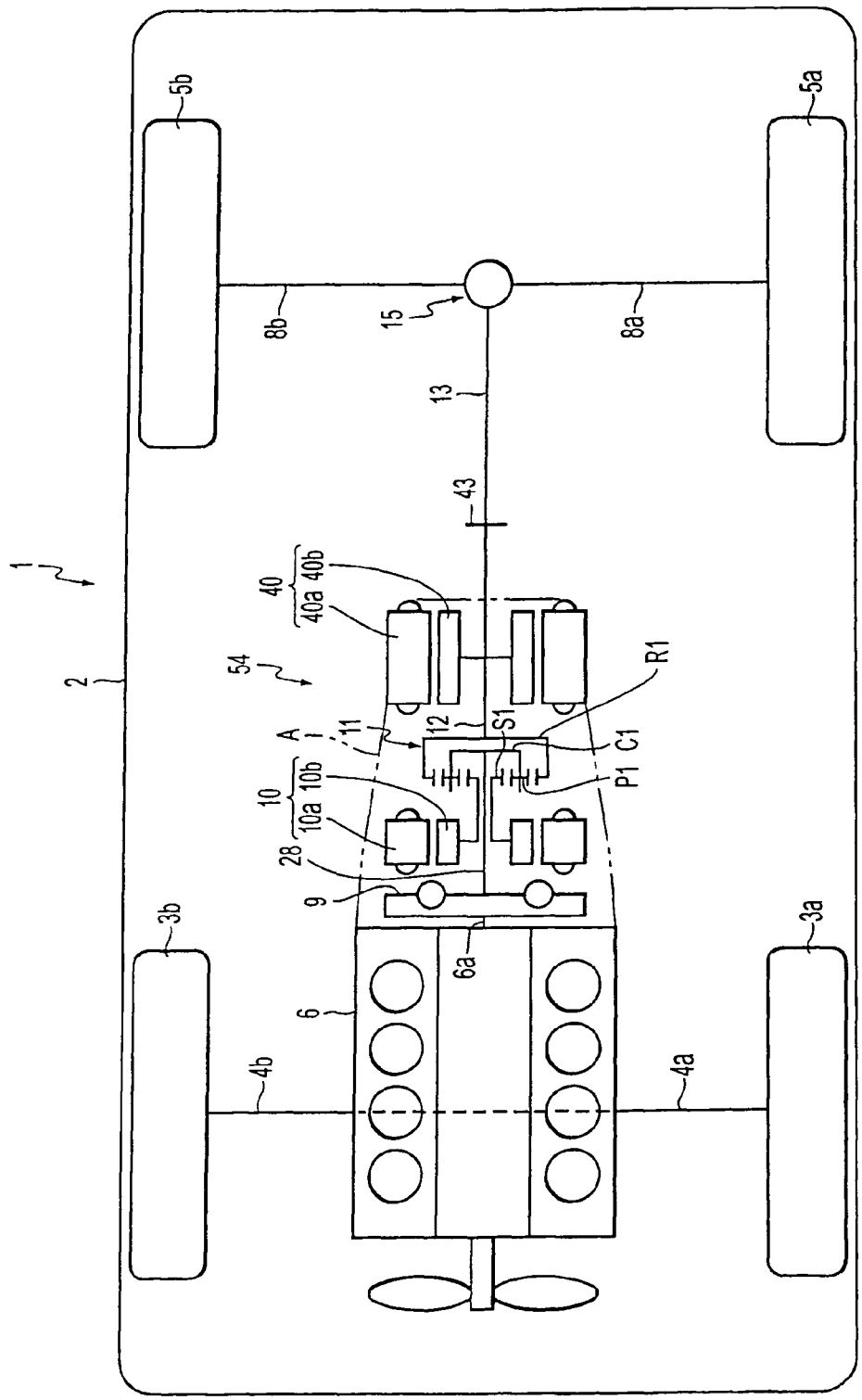
FIG. 9 is a top plan view schematically showing the case, in which the hybrid drive unit is mounted as it is on the front engine rear wheel drive type automobile.

On the other hand, as shown in FIG. 8, the body 2 is provided with a center housing 240, which extends in the longitudinal direction at the widthwise central portion and protrudes into the compartment space. The center housing 240 is given a shape similar to the conventional one for housing the propeller shaft, and extends continuously in the longitudinal direction at the central portion of the rear seat from the automatic transmission housing space.

The second motor $210_1$ of the axially enlarged structure is housed together with the reducing planetary gear 211 in the motor housing 230, which is so diametrically sized to be housed in the center housing 240. The second motor $210_1$ is sized diametrically to be restricted by the aforementioned space and axially to have a predetermined output determined by the vehicle weight, an acceleration demand and so on. The reducing planetary gear 211 is made of a simple planetary gear arranged coaxially with the output shaft $216_1$ and is provided with a ring gear R2 connected to the output shaft $216_1$, a sun gear S2 connected to the rotor 219 and a carrier C2 fixed in the motor housing 230 for supporting a plurality of pinions P2. The output shaft $216_1$ having the ring gear R2 fixed integrally therewith protrudes from the motor housing 230 and extends further backward until it is connected to a differential unit 222 through a coupling 220 and a propeller shaft 221 (including, as a matter of fact, the universal joint and the center bearing, although not shown) and further from the differential unit through left and right drive shafts 223l and 223r to rear wheels 225 and 225.

Figure 7:
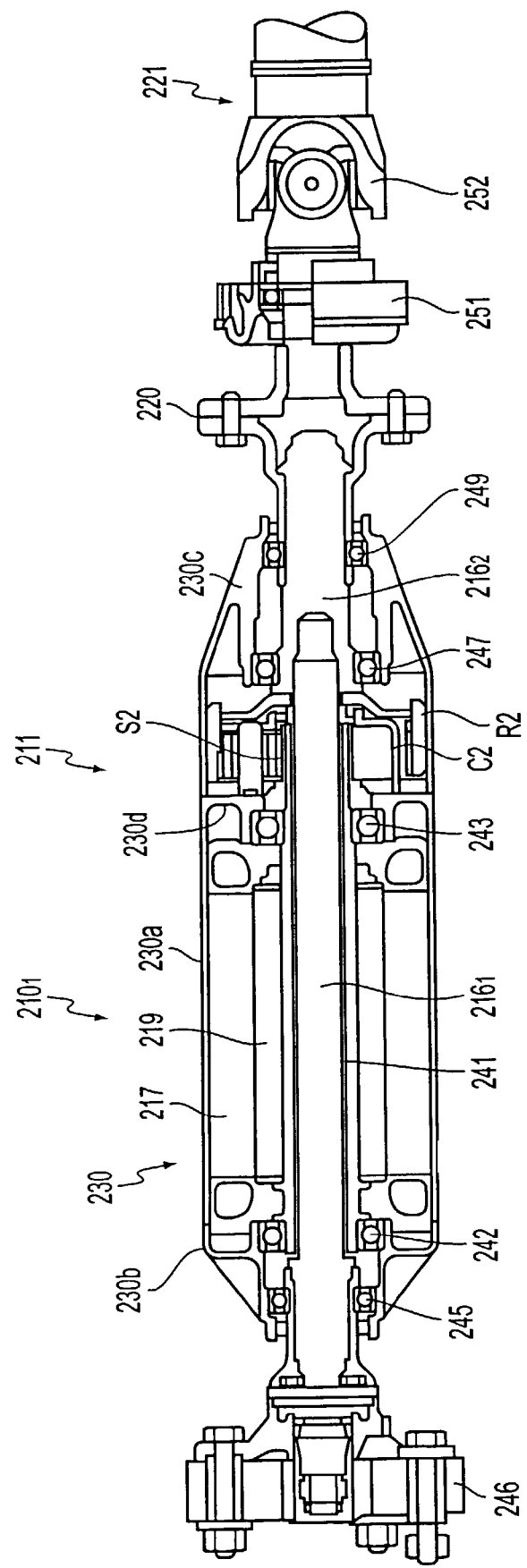
FIG. 7 is a longitudinal section showing such a portion of the hybrid drive unit of the fourth embodiment as corresponds to a second motor (or a drive motor) and a reducing planetary gear.

As shown in detail in FIG. 7, the second motor 210 includes the stator (or core) 217 having a larger axial size that the diametrical size. For example, the axial size is about 1.1 to 2.0 times as large as the diametrical size. This elongated stator 217 is fixed integrally with the motor housing 230, and the rotor 219 is so arranged in the motor housing 230 as to confront the stator 217. On the inner circumference of the rotor 219, there is integrally fixed a sleeve shaft 241, which is rotatably supported at its portions protruding to the two sides of the rotor 219 at both sides through bearings 242 and 243. Through the hollow portion of the sleeve shaft 241, moreover, there extends the output shaft $216_1$, which is fitted rotatably relative to the sleeve shaft 241 through bushes or needles.

The output shaft $216_1$ is rotatably supported at its front-end portion by the motor housing 230 through a bearing 245 and is protruded forward from the motor housing 230. The front-end portion of the output shaft $216_1$ is connected in alignment to the intermediate shaft 232 through a flexible coupling 246. On the rear end portion of the output shaft $216_1$, moreover, there is integrally splined a second output shaft $216_2$, which has a larger diameter. This second output shaft $216_2$ is rotatably supported in the motor housing 230 through two bearings 247 and 249, which are axially spaced at a predetermined distance. Therefore, the output shafts $216_1$ and $216_2$ are rotatably supported by the center structure on the axially outer sides of the supporting portions 242 and 243 of the rotor 219.

The motor housing 230 is constructed to include a cylindrical body 230a, and a front cover 230b and a rear cover 230c, which are fixed to cover the two end portions of the body 230a. The bearings 242 and 245 supporting the front sides of the rotor 219 and the output shaft $216_1$ are mounted in the front cover 230b. Moreover, the body 230a has the stator 217 integrally fixed on its inner circumference and is provided at its rear portion with a partition wall 230d, on which the bearing 243 for supporting the rear portion of the rotor 219 is mounted. On the rear cover 230c, moreover, there are mounted the two bearings 247 and 249 for supporting the second output shaft $216_2$.

Between the partition wall 230d of the body 230a and the rear cover 230c, moreover, there is housed the reducing planetary gear 211. This planetary gear 211 has its external diameter sized to be housed in the cylindrical body 230a of the motor cover 230. In this planetary gear 211, the carrier C2 is fixed on the partition wall 230d, the sun gear S2 is mounted on the rear end portion of the sleeve shaft 241 and the ring gear R2 is fixed on the front end face of the second output shaft $216_2$.

This second output shaft $216_2$ protrudes and extends at its rear portion from the rear cover 230c so far that its protruding portion is connected to the propeller shaft 221 through the coupling 220. This propeller shaft 221 is supported by a center bearing 251 and is provided with a universal joint 252 and a spline so as to absorb the bounces of the rear wheels 225. Moreover, the rear end portion of the propeller shaft 221 is associated with the differential unit 222.

As shown in detail in FIG. 8, on the other hand, the center housing 240 is extended in the longitudinal direction at the widthwise central portion of the body 2, and a bottom plate 253 is so fixed to the body 2 by bolts 255 as to cover the lower open portion of a housing portion 240a of the housing 240. On the bottom plate 253, there is fixed by bolts or the like a lower plate 259 of a rubber mount 257, which is provided with a plurality of mount rubbers 256 and 256 inclined upward to the center. The motor housing 230 is fixed on the upper plate 261 of the rubber mount 257 by bolts or the like. Therefore, the motor housing 230 is mounted on the body 2 in the housing portion 240a of the center housing 240 through the rubber mount 257.

Likewise, in the front engine rear wheel drive type automobile $1_1$ having the hybrid drive unit $26_1$ mounted thereon, the output of the internal combustion engine 6 is transmitted through the damper unit 9 and the input shaft 28 to the power distributing planetary gear 11, by which the output is distributed to the first motor (or generator) 10 and the intermediate shaft 232. By controlling the first motor 10, moreover, the output rotation from the intermediate shaft 232 is continuously adjusted. The rotation of the intermediate shaft 232 is transmitted through the flexible coupling 246 to the output shaft $216_1$. If necessary, moreover, the second motor $210_1$ is driven, and its output is decelerated by the reducing planetary gear 211 and transmitted to the second output shaft $216_2$ thereby to assist the power outputs of the output shafts $216_1$ and $216_2$. Moreover, the rotation of the output shaft $216_2$ is transmitted through the coupling 220, the propeller shaft 221 and the differential unit 222 to the left and right drive shafts 223l and 223r thereby to drive the rear wheels 225 and 225.

At this time, the first motor 10 and the power distributing planetary gear 11 are supported by the transmission case 229 thereby to construct the vibration system common with the engine 6. On the other hand, the second motor $210_1$ and the reducing planetary gear 211 are mounted by the motor housing 230, which is mounted directly on the body 2, thereby to construct a vibration system different from the aforementioned engine side. The intermediate shaft 232 and the output shaft $216_1$ thus constructed of the separated vibration systems are connected through the flexible coupling 246 so that their rotations can be smoothly transmitted while allowing the different vibration systems to vibrate separately from each other.

Moreover, the second motor $210_1$ is supported by the motor housing 230, which is mounted directly on the body 2, and is separated from the first motor 10, which is supported in the transmission case 229 on the side of the engine. Therefore, the resonance frequency of the hybrid drive unit $26_1$ can be easily shifted from the region used in the vehicle to a higher order. The structure is thus advantageous in improving the rigidity of the power plant of this front engine rear wheel drive type automobile $1_1$.

Moreover, the second motor $210_1$ and the reducing planetary gear 211 are arranged separately from the first motor 10 and the power distributing planetary gear 11 so that the degree of freedom for mounting the hybrid drive unit $26_1$ on the vehicle is improved. Especially the second motor $210_1$ is made into such an axially enlarged structure as can be housed in the motor housing 230. Without making any large modification in the front engine rear wheel drive type body 2 having the conventional automatic transmission (AT), therefore, the hybrid drive unit $26_1$ can be mounted. Although the second motor $210_1$ has the axially enlarged structure, the rotor 219 is supported in the motor housing 230 by the center structure, and the output shafts $216_1$ and $216_2$ are also precisely supported by the center structure. Therefore, the air gap between the stator 217 and the rotor 219 can be precisely held to improve the efficiency of the second motor $210_1$.

On the other hand, the propeller shaft 221 is a rotary member on one hand and is bounced on the other by the relative motions of the rear wheels 225. Therefore, the center housing 240 requires a clearance for avoiding the interference with the propeller shaft 221. However, the motor housing 230 is mounted directly on the body 2, and the stator 217 is fixed directly on the inner circumference of the motor housing 230 so that the space efficiency can be improved.

According to an exemplary aspect of the invention, the second motor is separated from the first motor, the power distributing planetary gear and so on and is connected directly to the differential unit so that the second motor can be arranged independently of the body shape along the propeller shaft. Therefore, it is possible to improve the degree of freedom for mounting the hybrid drive unit on the front engine rear wheel drive type automobile. As a result, the first motor, the power distributing planetary gear and so on can be confined in the arrangement space of the conventional automatic transmission thereby to make it unnecessary to change the vehicle itself drastically by renewing the platform. Thus, it is possible to achieve a drive unit, which is suitably mounted on the front engine rear wheel drive type automobile capable of mounting an engine of a large displacement while eliminating the disadvantages such as the sacrifice of the passenger (or cargo) space. Moreover, the second motor need not be especially small-sized so that a motor expected to generate a sufficient torque can be arranged as the second motor.

Moreover, the automobile having the hybrid drive unit mounted thereon is far better improved in the mileage than the vehicle which is constructed to be run exclusively by the drive force of the engine. Therefore, the gasoline tank, which is usually arranged in most cases below the rear seat, can be suppressed to a small size so that the second motor can be sufficiently arranged in the accordingly emptied space.

According to another exemplary aspect of the invention, the second motor is connected to the transmission downstream side of the ring gear so that the engine torque is inputted to the ring gear. It is, therefore, also possible to reduce the size of the differential unit.

According to another exemplary aspect of the invention, the second motor is connected to the transmission downstream side of the ring gear. In the regeneration case at the braking time or the like, the rotating drive force of the rear wheels can be transmitted to the second motor and not through the meshing portion of the hypoid gear in the differential unit. Therefore, the transmission efficiency, as might otherwise be reduced by about 40%, can be improved to improve the regeneration efficiency (or power recovery factor). Moreover, what is inputted to the hypoid gear is the engine torque the power sharing component so that the size of the hypoid gear can be reduced.

According to another exemplary aspect of the invention, the rotation transmitting gear is connected to the second motor by fixing the rotation transmitting gear in the differential case so that it may be able to rotate integrally with the ring gear. It is, therefore, possible to realize a hybrid drive unit, which has a simple construction but can be assisted by the single second motor or can sufficiently regenerate at the braking time.

According to another exemplary aspect of the invention, the second motor is composed of the stator and the rotor, and the rotation transmitting gear is connected to the rotor of the second motor through the reduction gear train having a plurality of parallel gears. By changing the gear number of the reduction gear train suitably, therefore, it is possible to realize the construction, which can connect the second motor easily and reliably to the rotation transmitting gear in accordance with the arrangement of the second motor.

According to another exemplary aspect of the invention, the second motors are individually arranged on the left and right drive shafts. By simply arranging two motors for generating a half torque, therefore, it is possible to attain effects similar to those of the case having the single second motor, and to apply the drive forces from the individual second motors individually to the corresponding rear wheels. Therefore, it is possible to improve the drive controllability of the vehicle. It is also possible to reduce not only the size of the hypoid gear but also the size of the differential.

According to another exemplary aspect of the invention, the left and right second motors are arranged coaxially on the left and right drive shafts, respectively, and their rotors are connected individually to the drive shafts through the reducing planetary gears coaxially arranged individually with the left and right drive shafts. Therefore, the second motors can be arranged in a space as small as possible, although they are two in number.

According to another exemplary aspect of the invention, the first and second rotation transmitting gears are fixed on the left and right drive shafts, respectively, and are connected to the individual rotors of the left and right second motors through the reduction gear trains having a plurality of parallel gears. By changing the number of gears of the reduction gear trains suitably, therefore, it is possible to realize the construction, in which the individual second motors can be easily and reliably connected to the rotation transmitting gears in accordance with their arrangement.

According to another exemplary aspect of the invention, the intermediate shaft and the output shaft are connected through the coupling. Therefore, the power can be smoothly transmitted between the intermediate shaft and the output shaft while absorbing the different vibrations between the transmission case and the motor housing.

According to another exemplary aspect of the invention, the second motor is given the axially enlarged structure, in which the axial size is longer than the diametrical size. Therefore, the second motor can be easily arranged on the body thereby to improve the utilizing efficiency of the space without sacrificing the compartment (or cargo) space of the automobile.

According to another exemplary aspect of the invention, the reducing planetary gear is housed in the motor housing. Therefore, it is possible to improve the mountability of the hybrid drive unit on the front engine rear wheel drive type automobile.

According to another exemplary aspect of the invention, the compact structure can be made by fixing the stator of the second motor in the motor housing. With the axially enlarged structure of the second motor, moreover, the rotor and the output shaft can be supported as the center structure by the motor housing thereby to improve the supporting precision of the motor, and the air gap between the stator and the rotor can be precisely managed to improve the efficiency of the second motor.

According to another exemplary aspect of the invention, the hybrid drive unit having the excellent mountability is mounted on the front engine rear wheel drive type automobile without any drastic change in the body. As a result, a front engine rear wheel drive type hybrid vehicle can be practiced without being accompanied by a high rise in the cost.

According to another exemplary aspect of the invention, the motor housing for supporting the second motor of the axially large structure is housed in the center housing of the body. By fixing the stator in the motor housing, therefore, the center housing space can be exploited, and the body of the automobile having the conventional automatic transmission mounted thereon can be employed without any large change.

According to another exemplary aspect of the invention, the propeller shaft is housed together with the motor housing in the center housing. It is, therefore, possible to exploit the center housing space more effectively.

According to another exemplary aspect of the invention, the transmission case is fixed on the internal combustion engine, and the motor housing is mounted on the body. Therefore, the first motor and the power distributing planetary gear on the engine side, and the motor housing can be mounted by the different oscillation systems so that the resonance frequency of the hybrid drive unit can be shifted to a side higher than the region employed by the vehicle. It is, therefore, also possible to improve the rigidity of the power plant of the vehicle.

According to another exemplary aspect of the invention, the motor housing is mounted on the body through the rubber mount. Therefore, the rigidity of the body can be intensified by the separation of the oscillation systems, and the efficiency can be easily enhanced by improving the supporting precision of the second motor.

According to another exemplary aspect of the invention, the hybrid drive unit is mounted on the front engine rear wheel drive type automobile according to any of the exemplary aspects. When this front engine rear wheel drive type automobile is to be mounted on the hybrid drive unit, therefore, it is unnecessary to modify the vehicle itself drastically by renewing the platform or the like, and it is possible to eliminate the disadvantage such as the sacrifice of the passenger (or cargo) space.

The invention is not limited to the aforementioned embodiments, and various modifications based on the purpose of the invention are possible, which are regarded as within the scope of the invention.

What is claimed is:

1. A hybrid drive unit, comprising
a first electric motor;
a first planetaiy gear;
a second electric motor, wherein:
   (a) the first planetary gear distributes and transmits a drive force transmitted from an input shaft to the first electric motor and an output shaft, with the input shaft drivingly connected to an engine output shaft of an internal combustion engine,
   (b) a power output from the output shaft and the second electric motor are synthesized, and
   (c) the first electric motor and the first planetary gear are housed in a transmission case with the second electric motor spaced from the transmission case; and
a differential unit that is drivingly connected to the output shaft through a propeller shaft, wherein the second electric motor is closer to the differential unit than the second electric motor is to the transmission case, and the differential unit drivingly connects the second electric motor to the propeller shaft, wherein:
   the differential unit has a hypoid gear including a ring gear fixed in the differential unit and a drive pinion meshing with the ring gear and fixed on a leading end of the propeller shaft for distributing the drive force transmitted from the output shaft to the propeller shaft to individual drive shafts of left and right rear wheels, and the second electric motor is arranged downstream from power output from the differential unit,
   rotation transmitting gears are fixed in the differential unit so as to rotate integrally with the ring gear and the rotation transmitting gears are drivingly connected to the second electric motor, and
   the second electric motor includes a stator and a rotor, the rotation transmitting gears are drivingly connected to the rotor of the second electric motor through a reduction gear train having a plurality of parallel gears, and the rotation transmitting gears mesh with the reduction gear train.

2. An automobile having the hybrid drive unit of claim 1, further comprising:
   the internal combustion engine arranged in a front portion of a body with a crank shaft positioned in a longitudinal direction of the body, wherein the hybrid drive unit is arranged generally coaxially with the crank shaft, the input shaft is drivingly connected to the crank shaft of the internal combustion engine and the output shaft is associated with the rear wheels through a differential unit.

* * * * *